United States Patent [19]

Baxter, Jr. et al.

[11] Patent Number: 5,226,860
[45] Date of Patent: Jul. 13, 1993

[54] VEHICLE TORQUE TRANSFER CASE

[75] Inventors: Ralph W. Baxter, Jr.; Robert Leeper; David C. Reuter, all of Fort Wayne, Ind.

[73] Assignee: Dana Corporation, Toledo, Ohio

[21] Appl. No.: 815,384

[22] Filed: Dec. 31, 1991

[51] Int. Cl.⁵ .............................................. F16H 3/44
[52] U.S. Cl. .................................... 475/206; 475/221; 475/248; 475/295; 180/247; 180/248
[58] Field of Search ............... 475/206, 221, 222, 248, 475/295, 332, 346; 180/245, 247, 248

[56] References Cited

U.S. PATENT DOCUMENTS

| | | | |
|---|---|---|---|
| 2,395,772 | 2/1946 | Winther | 192/84 |
| 2,788,872 | 4/1957 | Winther | 192/0.052 |
| 2,936,054 | 5/1960 | Simon et al. | 192/84 |
| 2,956,657 | 10/1960 | Rudisch | 192/84 |
| 3,288,257 | 11/1966 | Ulbing | 192/35 |
| 3,329,247 | 7/1967 | Jaeschke | 192/84 |
| 3,379,292 | 4/1968 | Grygera | 192/12 |
| 3,404,762 | 10/1968 | Leblanc | 192/84 |
| 3,989,129 | 11/1976 | Brandenstein | 192/84 R |
| 4,458,557 | 7/1984 | Hayakowa | 180/247 X |
| 4,632,207 | 12/1986 | Moore | 180/247 |
| 4,714,129 | 12/1987 | Mueller | 180/247 X |
| 4,719,985 | 1/1988 | Zaiser | 180/248 X |
| 4,721,011 | 1/1988 | Kubo et al. | 475/206 X |
| 4,726,254 | 2/1988 | Kubo et al. | 475/206 X |
| 4,747,464 | 5/1988 | Lanzer | 475/295 X |
| 4,781,265 | 11/1988 | Weiler et al. | 180/247 X |
| 4,860,612 | 8/1989 | Dick et al. | 475/221 X |
| 4,878,399 | 11/1989 | Kameda | 180/248 X |
| 4,883,138 | 11/1989 | Kameda et al. | 180/248 X |
| 4,923,029 | 5/1990 | Lanzer | 180/248 |
| 4,982,809 | 1/1991 | Nakamura et al. | 180/248 |
| 4,994,007 | 2/1991 | Miura et al. | 475/346 |
| 5,078,660 | 1/1992 | Williams et al. | 475/221 X |

Primary Examiner—Rodney H. Bonck
Assistant Examiner—Ryan Massey
Attorney, Agent, or Firm—MacMillan, Sobanski & Todd

[57] ABSTRACT

The present invention relates to a vehicle four wheel drive torque transfer case having a friction clutch which is selectively engaged when it is desired to place the transfer case in a four wheel drive operating mode. The transfer case includes an input shaft which is connected to supply torque to a rear output shaft. A multi-disc friction clutch is connected between the input shaft and a front output shaft for supplying torque to the front output shaft. A planetary gear assembly includes a sun gear, a carrier a planet carrier connected to the input shaft, and a ring gear coupled to drive the front output shaft. The multi-disc clutch is interposed between the sun gear and the ring gear and is engaged to inhibit any rotation of the planet carrier relative to the ring gear and thereby transfer torque to the front output shaft. The planetary gear assembly functions as a §'torque multipler" and this reduces the torque capacity requirements for the clutch.

4 Claims, 3 Drawing Sheets

VEHICLE TORQUE TRANSFER CASE

BACKGROUND OF THE INVENTION

The present invention relates generally to vehicle transmissions and, in particular, to a vehicle transmission such as a four wheel drive torque transfer case which includes a friction clutch for placing the transfer case in a four wheel drive mode.

Four wheel drive (4 WD) systems for vehicles are becoming increasingly popular, due to the enhanced traction capabilities that such systems can provide in inclement weather or off highway conditions over conventional 2 WD systems. Such 4 WD systems generally include a torque transfer case which can either be integral with or separate from the main transmission. The torque transfer case can include an input shaft connected to the output of the main transmission, a rear output shaft connected to drive the vehicle rear wheels, a front output shaft connected to drive the vehicle front wheels, and means for drivingly connecting the input shaft to the front and rear output shafts.

In one type of 4 WD system known as a "part time" system, when in a 4 WD mode, there is a direct drive connection between the front and rear output shafts of the transfer case. This direct drive connection does not permit the transfer case to accommodate different front and rear wheel speeds which can occur when turning the vehicle. Accordingly, the 4 WD mode is generally used only on a "part time" basis, such as when lower friction road surface conditions, e.g., wet or snow covered pavement, may require increased traction capabilities. When turning the vehicle under these conditions, the lower friction road surface allows a limited amount of slip between the slightly faster spinning front wheels and the road surface. Otherwise, turning such a vehicle on a higher friction surface, such as dry pavement, results in what is known as "front wheel hop".

Some vehicles are provided with a "full time" 4 WD system which is permanently engaged in all driving conditions. In this type of system, which has become known as an "all wheel drive" (AWD) system, the transfer case is generally provided with an interaxle differential for dividing torque between the vehicle front and rear differentials. The interaxle differential accommodates different front and rear wheel speeds when turning the vehicle, and thus enables the system to remain permanently engaged in all operating conditions. Also, in order to prevent excessive slipping between the front and rear wheels, and transfer cases typically include a selectively engageable clutch means which is operative to lock the interaxle differential upon sensing a predetermined slippage between the front and rear output shafts of the transfer case.

SUMMARY OF THE INVENTION

The present invention concerns a four wheel drive transfer case which includes a multi-disk friction clutch which is operable to control engagement of a clutch between 2 WD, automatic (i.e., "on demand" 4 WD), and "part time 4 WD" operating modes. In accordance with the present invention, a planetary gear assembly is utilized as a torque multiplier to reduce the normal torque requirements of the clutch.

The transfer case includes an input shaft for a directly supplying torque to a rear output shaft which in turn drives the rear wheels of the vehicle. In some instances, a gear reducer is connected between the input shaft and the rear output shaft for providing high and low speed operating ranges. The transfer case further includes a front output shaft for connection to the front wheels of the vehicle. An electromagnetic multi-disc friction clutch is coupled between the rear output shaft and the front output shaft and is actuated when it is desired to shift the transfer case to four wheel drive operating mode. In accordance with the present invention, a planetary gear assembly is interposed between the rear output shaft and the multi-disc clutch and functions as a torque multiplier to reduce the overall torque requirements of the clutch.

More specifically, the planetary gear assembly includes a sun gear, a planet carrier, a ring gear, and a plurality of planet gears carried by the planet carrier and meshingly engaged between the sun gear and the ring gear. The planet carrier is connected for rotation with the rear output shaft, and the ring gear is connected to drive the front output shaft. The friction clutch includes a first plurality of discs connected for rotation with the sun gear, and a second plurality of discs connected for rotation with the ring gear. An electromagnet is utilized to selectively bias the clutch disks towards one another, thereby inhibiting rotation between the planet carrier and the ring gear. This causes a transfer of a portion of the input torque to the front output shaft to drive the front wheels of the vehicle. Depending on the particular vehicle operating parameters, the transfer case can be operated in an "auto" mode wherein the electromagnetic clutch can be modulated to control the amount of torque directed to the front wheels.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
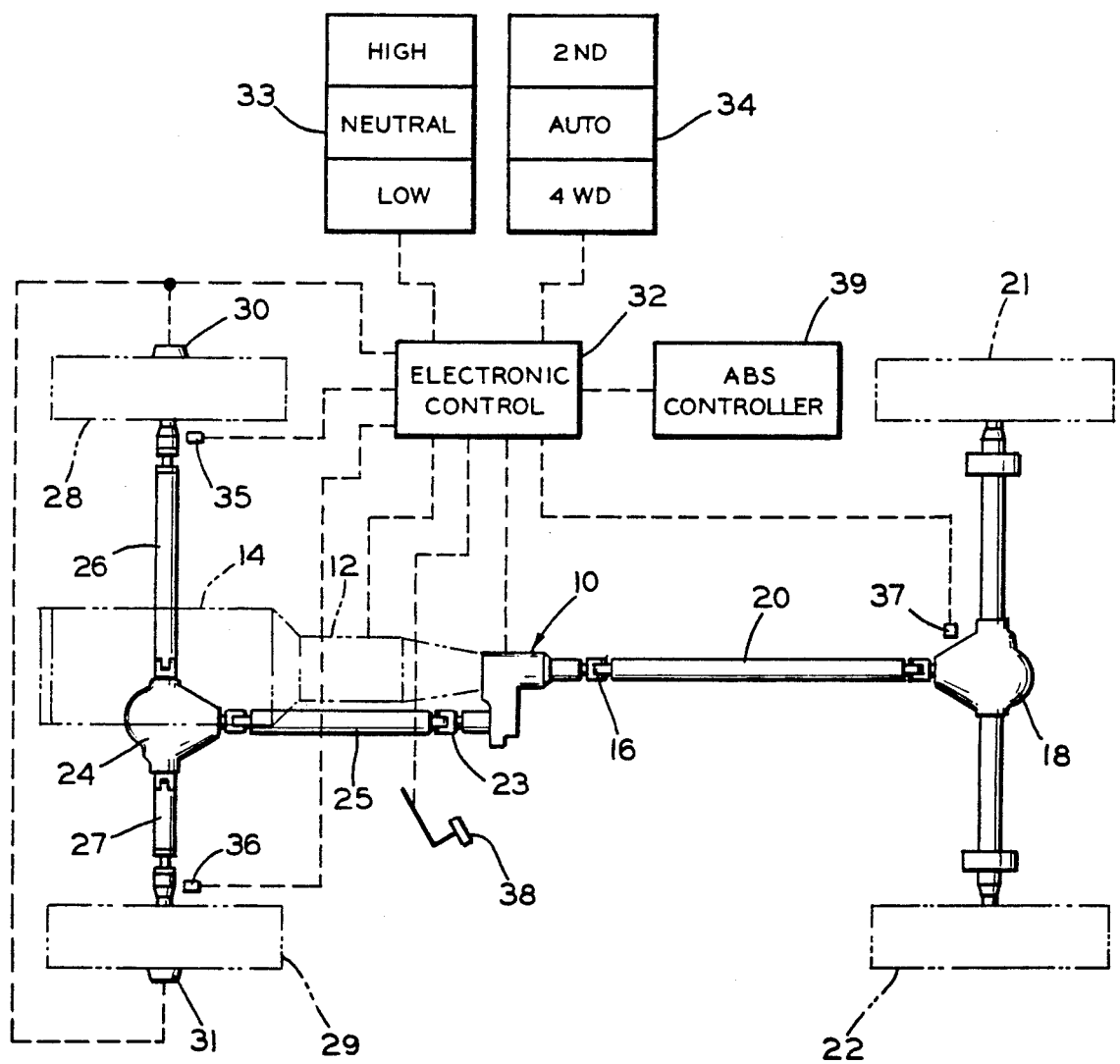
FIG. 1 is a top plan view of a four wheel drive system including a electronically controlled transfer case having the features of the present invention.

Referring first to FIG. 1, there is shown a vehicle four wheel drive system which can utilize a torque transfer case incorporating the features of the present invention. As shown in FIG. 1, a transfer case 10 is secured to the rear of a main transmission 12 (shown in phantom) which in turn is coupled to a drive engine 14 (also shown in phantom). As will be discussed, the transmission 12 is provided with an output shaft which is coupled to an input shaft of the transfer case 10. The transfer case 10 includes a rear output shaft which is connected at 16 to a rear drive shaft 20 which in turn is connected to a rear differential. The rear differential 18, which can be a limited slip type, divides torque from the drive shaft 20 between the rear wheels 21 and 22.

The transfer case 10 is provided with a front output shaft which is connected at 23 to a front drive shaft 25 which in turn is connected to a front differential 24. The front differential 24, which can also be a limited slip type, divides torque received from the front drive shaft 25 between front axles 26 and 27 which are connected to vehicle front wheels 28 and 29 by automatic hub locks 30 and 31, respectively. The hub locks can be vacuum actuated.

Also shown in FIG. 1 are certain electrical connections (shown as dashed lines) to a microprocessor-based electronic control which is represented by a block 32. The transfer case can be operated in various operating modes as selected by the vehicle driver via control switches 33 and 34, which are typically located in the vehicle interior within convenient reach of the driver. The one switch 33 is used to shift the transfer case between high range, neutral, and low range, while the second switch 34 allows the driver to select between three different operating modes: two wheel drive (2 WD), "on demand" four wheel drive (AUTO), and "part time" four wheel drive (4 WD). Each switch can include three separate status lights to provide a visual indication to the driver of the present operating mode. Also, when effecting a mode change such as a range shift, the respective light can be flashed until the shift is complete. In addition to being connected to control the transfer case in a manner as will be discussed, the control is also connected to generated activation signals to the hub looks 30 and 31 when the "on demand" or "part time" operating modes are selected.

To effect the desired control of the transfer case and the hub locks 30 and 31, the control 32 is connected to receive a plurality of input signals. The control 32 receives signals representing the individual front wheel speeds from separate speed sensors 35 and 36, and a signal representing an average rear wheel speed (vehicle road speed) from a single rear speed sensor 37 located at the rear differential 18 or, alternatively, in the transfer case 10. The speed sensors 35, 36 and 37 can be part of an ABS (anti-brake system) control, or they can be provided solely for use in controlling the transfer case. As will be discussed, the two front sensors are advantageously used in the "AUTO" mode to determine front steering angle which, in conjunction with the vehicle road speed, functions to determine the acceptable slip threshold of the rear wheels. In some situations, the two front sensors 35 and 36 may be replaced with a single front speed sensor located in the transfer case and then, if desired, obtain the steering angle information from another source (such as the steering gear).

The control 32 also receives a status signal from the transmission 12 which informs the control when the main transmission is in a "neutral" mode. As will be discussed the system only allows a shift between high and low range 4 WD and neutral when the transmission 12 is in neutral. The control further receives a brake status signal from the vehicle brake system indicating when a brake pedal 38 has been actuated. The control 32 can also be configured to supply a status signal to an ABS controller 39 to indicate when the system is operating in either the high or low 4 WD modes.

Figure 2:
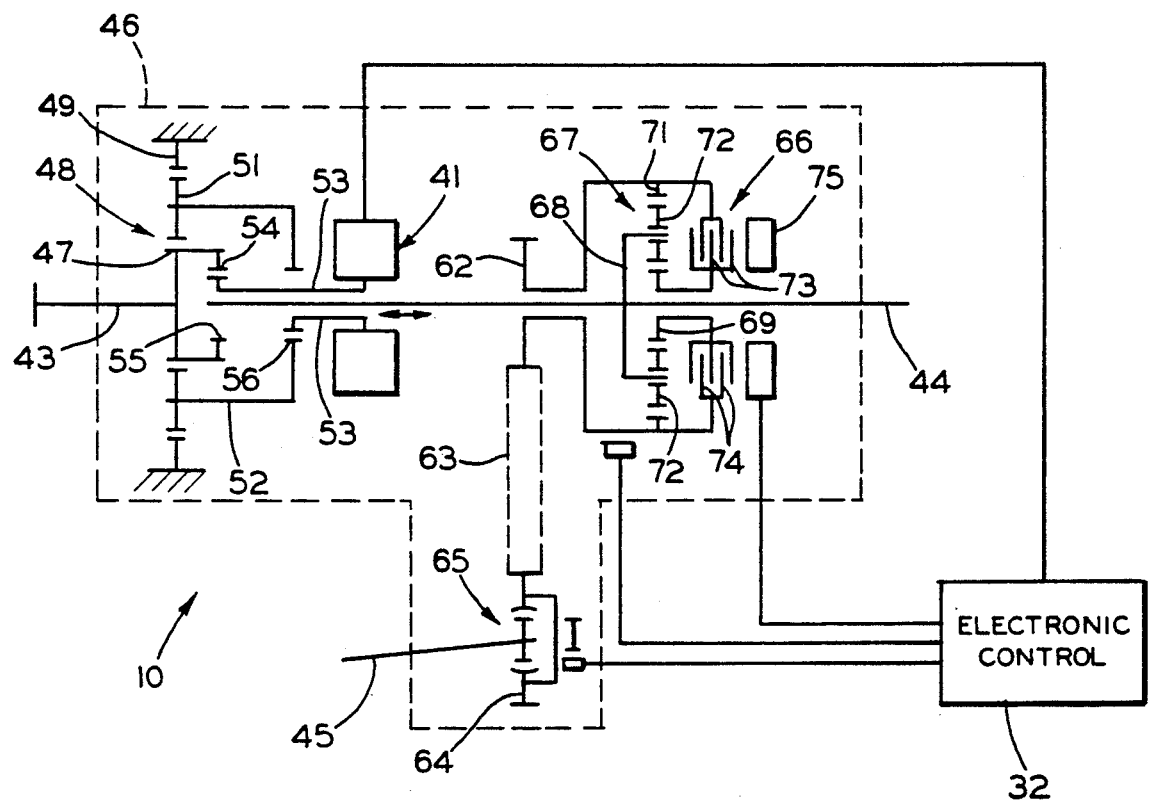
FIG. 2 is a schematic diagram of the internal components of the transfer case of FIG. 1.

Referring now to FIG. 2, there is shown a schematic diagram of the internal components of the transfer case 10 of FIG. 1, and which is constructed in accordance with the present invention. As shown in FIG. 2, the transfer case 10 includes an input shaft 43 coupled to the output shaft of the vehicle transmission 12 (shown in FIG. 1), a rear output shaft 44 for connection to the rear drive shaft 20, and an angled front output shaft 45 for connection to the front drive shaft 25. The input shaft 43 is connected to drive the output shaft 44 and a planet carrier 68 through a planetary gear reduction assembly 48.

The input shaft 43 is rotatably supported at the forward end of a transfer case housing 46 and incorporates a sun gear 47 which forms part of the planetary gear reduction assembly, generally indicated at 48, used to achieve the low gear operating range. The planetary assembly 48 includes a ring gear 49 fixed relative to the housing 46, and a plurality of planet gears 51 circumferentially spaced and individually rotatably supported by a planet carrier 52. The rear output shaft 44 extends forwardly into the housing 46 and carries at its forward end an axially moveable range shift sleeve 53 having external splines 54 for engagement with either internal splines 55 connected to the input shaft 43, or internal splines 56 connected to the planet carrier 52. When connected to the input shaft 43, as shown above the axis A—A in FIG. 2, there is a direct drive connection between the input shaft 43 and the rear output shaft 44 to define the high speed range. When connected to the planet carrier 52, as shown below the axis A—A, the planetary gear assembly 48 introduces a predetermined gear reduction to define the low speed range. When located at an intermediate position (not shown) between the input shaft splines 55 and the carrier splines 56, the transfer case is in neutral. A range shift actuator, generally indicated by a block 41, is utilized to effect the axial movement of the shift sleeve 53 between low range, neutral, and high range positions. If electrically actuated, the actuator 41 is coupled to receive control signals from the control 32 and, in some cases, to provide feedback information to the control.

A first drive sprocket 62 is rotatably supported on the central portion of the rear output shaft 44 and is connected by a drive chain 63 to drive a second drive sprocket 64 rotatably supported within the transfer case housing 46 and connected to drive the angled front output shaft 43 through a constant velocity universal joint 65.

A multi-disc clutch pack 66 is coupled between the rear output shaft 44 and the first drive sprocket 62 for controlling torque input to the front output shaft. In accordance with the present invention, planetary gear assembly, generally represented by the reference numeral 67, is utilized to couple the clutch between the rear output shaft and the front output shaft 45. The planetary gear assembly functions as a torque multipler which enables the overall torque capacity of the clutch to be substantially reduced.

The planetary gear assembly includes a planet carrier 68, a sun gear 69, a ring gear 71, and plurality of planet gears 72 rotatably supported on the carrier 68 and meshingly engaged between the sun and ring gears. The planet carrier 68 is connected for rotation with the rear output shaft 44. The sun gear 69 is connected for rotation with a first group of clutch plates 73 which, while axially moveable, are secured (by a spline connection) for rotation with the sun gear 69. The ring gear 71 is connected for rotation with a second group of clutch plates 74, which are also axially moveable. The bias torque of the clutch 66 is applied by an electromagnet 75 which is connected to receive operating signals from the control 32. If desired, the clutch can be modulated from zero to clutch capacity to deliver variable torque output in the "auto" operating mode.

Figure 3:
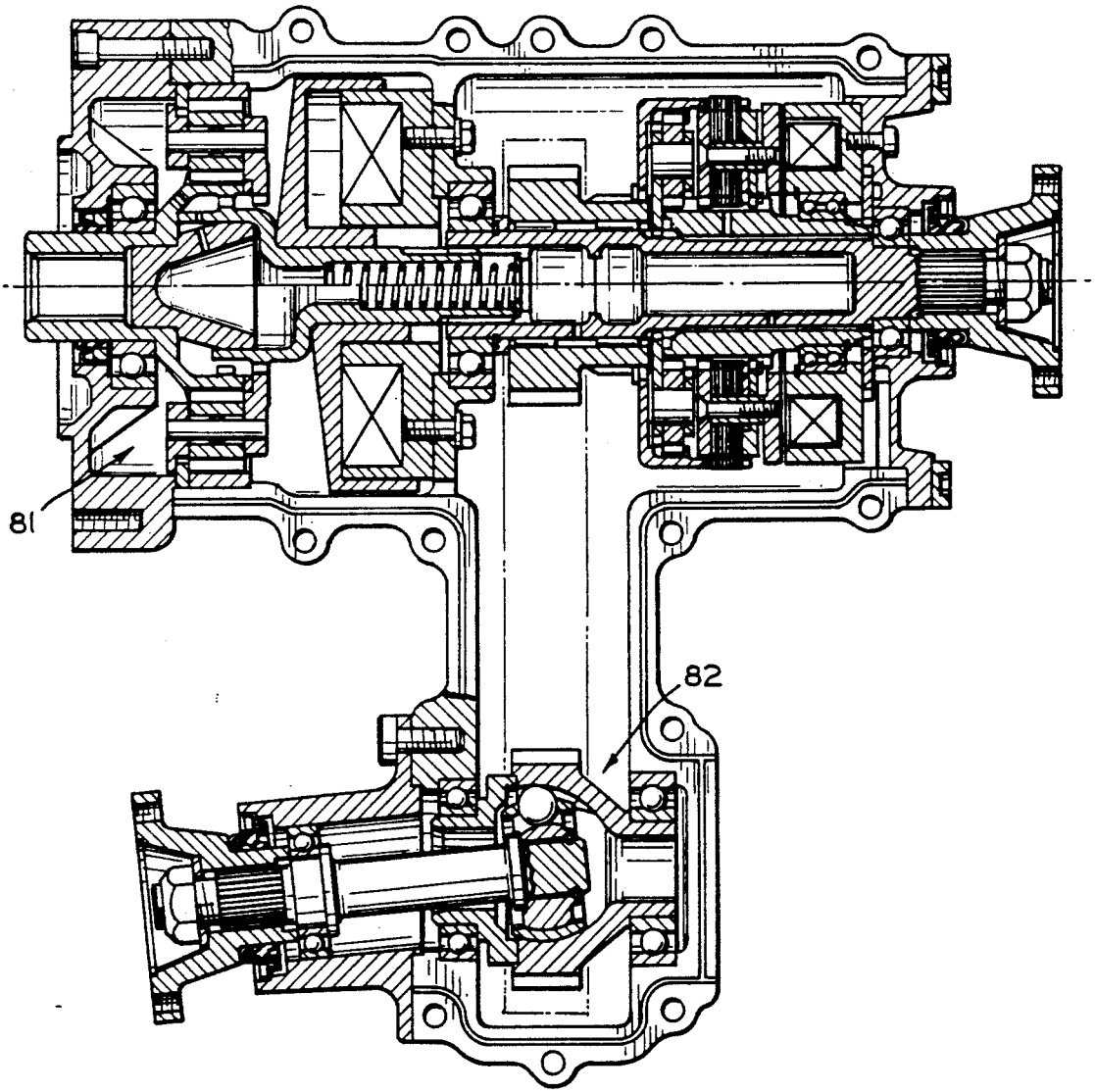
FIG. 3 is a sectional view through the transfer case of FIG. 1.

In operation, when the electromagnet 75 is actuated, friction develops between the plates and torque from the planet carrier 68 is transfered to the ring gear 71 via a multiplication respective to that of the planetary gear teeth plus the torque transfered through the clutch pack. The equation below describes the output torque obtainable given the torque capacity of the clutch alone ($T_c$)

$$\text{Torque output} = \frac{-T_c}{[N_r/2(N_s + N_p)] - 1}$$

Where $N_r$ = Number of ring gear teeth
$N_s$ = Number of sun gear teeth
$N_p$ = Number of planet gear teeth There is shown in FIG. 3 a sectional view of the transfer case schematically illustrated in FIG. 2. In FIG. 3, the transfer case includes a range shift actuating mechanism 81 similar to that described in U.S. Pat. No. 5,045,036, which is herein incorporated by reference. The transfer case also includes a constant velocity universal joint mounting arrangement, generally represented at 82, which is more fully described in allowed U.S. patent application Ser. No. 07/480,101, filed Feb. 14, 1990, and herein incorporated by reference. The 4 WD clutch and torque multiplying planetary gear assembly, generally represented at 83, has a structure similar to that in FIG. 2, and has elements identified by like reference numberals.

It should be noted that the transfer case illustrated in FIGS. 2 and 3 is only one example of a transfer case which can utilize the torque multiplying feature of the present invention. For example, the invention could also be used in other vehicle transmissions wherein it is desirable to control the torque transmitted between two members. Also, while the 4 WD clutch is shown as an electromagnetically actuated multi-plate clutch, it will be appreciated that the clutch could be pneumatically or hydraulically actuated, or could be a cone or other friction type clutch.

The transfer case and drive system of the present invention have been illustrated and described in what is considered to represent its preferred embodiment. However, it will be appreciated that the transfer case and drive system can be modified without departing from the spirit or scope of the attached claims.

What is claimed:

1. A vehicle transmission comprising:
a housing;
an input shaft rotatably supported within said housing;
an output shaft rotatably supported within said housing;
a planetary gear assembly having first, second and third components including a sun gear, a planet carrier and a ring gear, said planetary gear assembly further including a plurality of planet gears carried by said planet carrier and meshingly engaged between said sun gear and said ring gear, said first component connected to be driven by said input shaft and said second component coupled to drive said output shaft;
clutch means for selectively locking said third component relative to said second component to inhibit any rotation of said first component relative to said second component and thereby transfer torque to said output shaft; and
said third component freewheeling thereby turning but not driving another member when said clutch means has unlocked said second component and said third component.

2. A vehicle transmission according to claim 1, wherein said first component is said planet carrier, said second component is said ring gear, and said third component is said sun gear, said sun gear freewheeling thereby turning but not driving another member when said clutch means has unlocked said sun gear and said ring gear.

3. A vehicle transmission according to claim 1, including a second output shaft rotatably supported within said housing and means separate from said planetary gear assembly for drivingly connecting said input shaft to said second output shaft.

4. A vehicle transmission according to claim 2, including a second output shaft rotatably supported within said housing and means separate from said planetary gear assembly for drivingly connecting said input shaft to said second output shaft.

* * * * *